July 7, 1925.　　　　　B. JOHNSON　　　　　1,544,645
CUT OUT TOY
Filed Oct. 8, 1921　　　　2 Sheets-Sheet 1

Inventor
Burges Johnson
By his Attorney
Willis Fowler

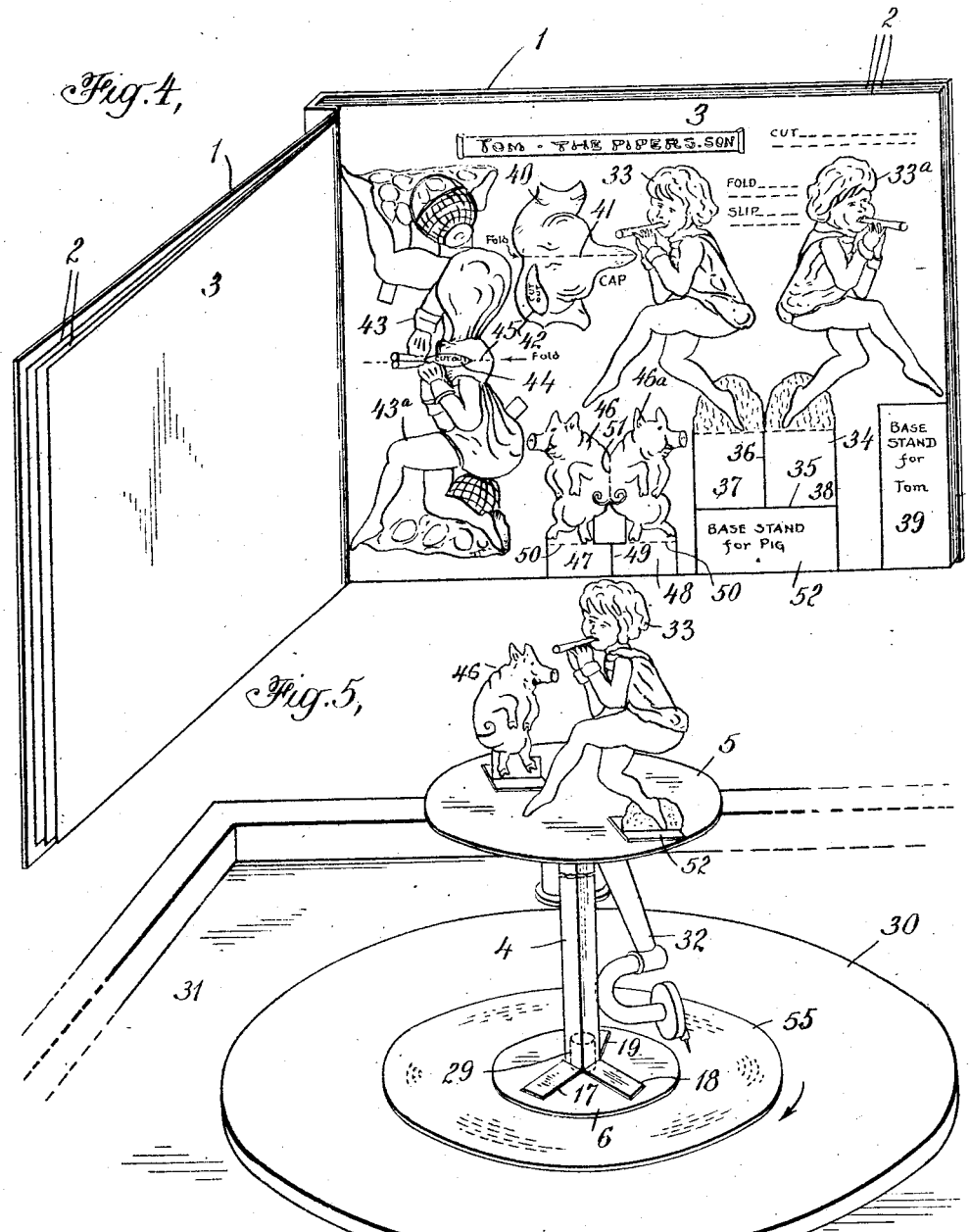

Patented July 7, 1925.

1,544,645

UNITED STATES PATENT OFFICE.

BURGES JOHNSON, OF POUGHKEEPSIE, NEW YORK, ASSIGNOR OF ONE-HALF TO RALPH MAYHEW, OF NEW YORK, N. Y.

CUT-OUT TOY.

Application filed October 8, 1921. Serial No. 506,317.

*To all whom it may concern:*

Be it known that I, BURGES JOHNSON, a citizen of the United States, and resident of Poughkeepsie, in the county of Dutchess and State of New York, have invented certain new and useful Improvements in Cut-Out Toys, of which the following is a specification.

My invention relates to devices which are used for amusement, entertainment and educational purposes and certain of my improvements are adapted for use in connection with moving or rotating means, such for example as the rotating table of an ordinary talking-machine on which a sound-reproducing record or disk is placed when it is to be played, so that the device partakes in the movements of such means. It has long been the custom for children to amuse themselves by means of so-called cut-out devices comprising usually a sheet of material, such as suitable paper, on which are outlined or printed certain characters or figures which the child cuts out from the sheet by means of scissors, following substantially the outlines of the figures, thereby obtaining the various figures in detached forms from the flat blank which originally contained the same. The paper craft outfits of this kind are very popular and make most desirable toys or amusement devices for children and another object of my present invention is to provide amusement and educational devices having the well known features of cut-outs combined with novel features of construction, assemblage and application, by means of which children may not only be amused in the use thereof, but may also be edified and taught to do work of a constructive, mechanical and artistic nature while thus at play, and may also be encouraged to devise and originate ways of amusing themselves by their own disposition and arrangement and rearrangement of the various made up cut-outs. With these and other objects in view, my invention consists in the various novel and peculiar construction and arrangements of the several different parts of the device, all as more fully hereinafter set forth and then pointed out in the claims.

I have illustrated a type of my invention in the accompanying drawings, wherein;

Fig. 4, is a perspective view of the book shown as opened at a different page from that shown in Fig. 2, and said page containing certain figures representing particular characters together with certain cut-out parts designed for union with the base portions of some of the figures.

Fig. 5, is a perspective view of part of an ordinary talking-machine and shows the rotating table thereof, with its central post for receiving the central eye of a sound reproducing disk, and with my improved made up platform and its upright shown as mounted on said central post of the table.

Figure 1:
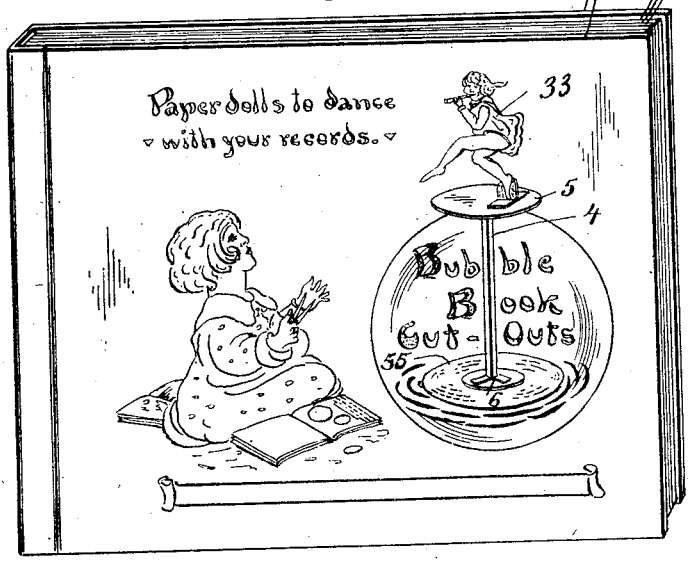
Fig. 1, is a perspective view of a book embodying my improvements and shown as closed, with illustrations and inscriptions on the front cover thereof.

Referring to the drawings, in which like numerals of reference designate like parts throughout, 1 indicates the lids or cover of a book having a set of leaves bound therein and indicated at 2. The leaves 2 are made of suitable material that may be readily cut with scissors or a knife, and for which purpose I have used a relatively heavy paper of good quality, such for example as postcard paper. On one of the leaves such as that indicated at 3, and which may be termed a cut-out blank, are outlined or printed certain elements, namely; a foldable platform-support 4, a platform or stage 5, for attachment to the head of the support and a base 6, for the foot of the support when the latter is formed up into shape.

This page contains printed directions 7, for the user to follow in cutting out the figures and parts and folding and assembling the same in operative structural form. The foldable upright 4, is cut from the sheet by cutting on the heavy solid lines 8, 9, 10, 11 and 12, and its respective ends are cut inwardly a short distance on the solid lines 13, 14, and 15, 16, to form at these points the respective attaching-flaps 17, 18, 19, and 20, 21, 22. The free edge of the leaf forms one of the longitudinal edges of the cut-out upright, which when severed from the leaf is folded on the longitudinal dotted-lines 23,

Figure 3:
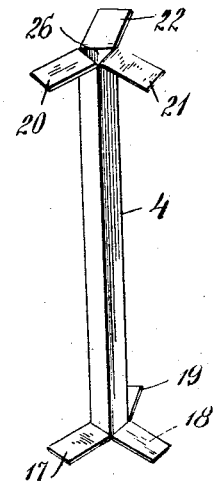
Fig. 3, is a perspective view of the made up supporting member for the platform and shown as detached ready to receive the platform upon one end and the base upon the other.
Figure 2:
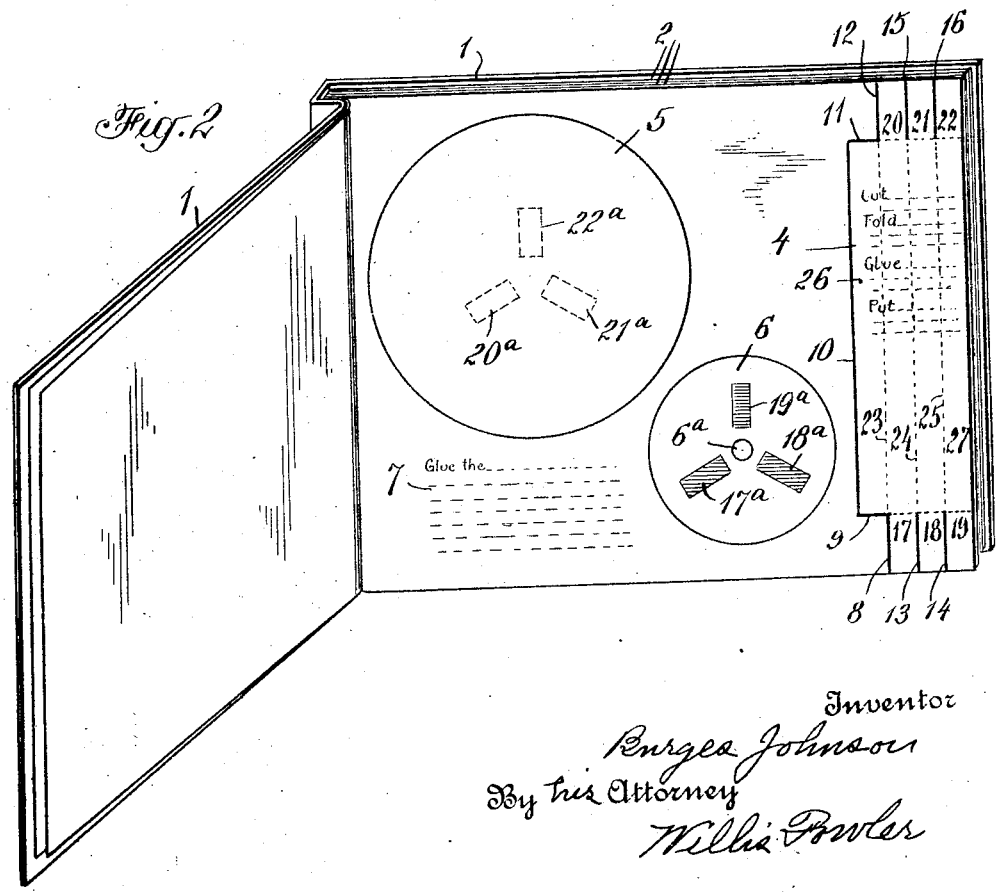
Fig. 2, is a perspective view of the book shown as opened at a certain page.

24 and 25, in line with the respective cuts at the ends of the blank, leaving the longitudinal flap 26, which is bent around and secured by suitable adhesive to the surface of the panel 27, of the folded structure, and there is thus formed a hollow polygonal shaped body with three sides with the attaching-flaps extending at right angles from each end, as shown clearly in Fig. 3, the triangular body being indicated at 4. The platform 5, and the base 6, after being cut from the blank sheet are pasted to the respective flaps 20, 21, 22, and 17, 18, 19, at the respective points on said parts indicated respectively at 20$^a$, 21$^a$, 22$^a$, and 17$^a$, 18$^a$, 19$^a$, and this forms a self sustaining structure for the platform or stage 5, on which the cut-out figures are indiscriminately placed. The base 6, is provided with a central circular orifice 6$^a$, for the reception of the cylindrical center post 29, of the turn table 30, of a talking-machine 31, the orifice registering with the hollow interior of the upright 4, and permitting the post 29, to enter said interior and gripped by the walls of the upright, thereby maintaining the same in vertical operative position as it is rotated by the motion of the table. The interior dimension of the foot of the hollow triangular support 4, is such that when pushed over the cylindrical post of the turn table, the flat sides thereof will yield and bow slightly outwardly and thereby grip the smooth surface of the post with considerable spring force and enable the upright to maintain its operative position. This hollow triangular column provides a strong structure because of its triangular formation and possesses considerable inherent strength so that it will resist lateral bending forces and thereby provide a stout support for the device, even though it be made of paper material. This structure is one of the important features of my improvements, likewise the polygonal or triangular gripping end or socket at the foot of the support for securely attaching the same to the revolving post of the turn-table to cause the support and its superposed platform with the figures thereon to partake of the motion of the turn-table carrying the talking-machine record at the time the record is being played. This peculiar construction of the support has its advantages over a hollow circular form of upright, as the triangular one can be folded and pasted more accurately and ensures a better fit.

On another page of the book appears a set of cut-out figures including that of a dancing boy 33, 33$^a$, shown in duplicate in reverse positions so that when folded against each other the printed or colored picture of the boy shows upon both sides of the object. The dancing boy is shown as playing a pipe and has one foot raised from the ground while the other foot is attached to a base-piece 34, which is cut out integrally with the figures, and is severed on the cross-line 35, and is then cut on the vertical line 36, to bring the two blank sides of the figures together. The two base flaps 37, 38, are then bent outwardly at right-angles and are pasted to a base section 39, which is cut from the edge of the page, so that the folded figure will have a secure base to stand upon when placed on the moving platform. Another figure on this page is a cap 40, for the boys head and it is cut from the sheet and then a hole 41, cut therein and the article is folded on the cross line 42, so that it can be placed on the head with a slight part of the head projecting through the hole to hold the cap in place. Another figure upon the same page, is indicated at 43, 43$^a$, and comprises part of the boy figure with a different costume or different colored costume and is designed to be cut out from the sheet and then a hole 44, cut therein at the neck for slipping the same over the head of the boy figure 33, 33$^a$, after being folded on line 45, in order to re-costume the figure in playing with the same. A figure of a pig 46, is also placed on this page with a duplicate part 46$^a$, and an integral base extension formed in two parts 47, 48, by cutting on the vertical line and folding at right-angles on lines 50. The figures are then folded on each other on the vertical dotted line 51, and the base flaps 47, 48, are pasted to a base-section 52, cut from the lower edge of the page, and this will give a broad and secure base for the figure to stand on.

The several cut-out figures herein selected for illustration are those relating to the story of "Tom, Tom the piper's son", and the cut-outs when used on the talking-machine have a record disk containing the song of that title to go with them and this record is played, while the characters are carried around with the revolving record. In carrying out my invention, I use the characters from many different juvenile stories, each booklet containing the cut-outs of one story, or of several stories as the case may be, and there are talking-machine record disks that go with each story, so that the particular record may be played when the character referred to therein is placed on the rotating platform.

In fact the improvements are particularly designed for use in conjunction with a well known series of books called "Bubble Books", which contain stories for children together with associated talking-machine record disks on which are recorded the songs or music corresponding to that printed in the books and which refer to certain characters in the book.

In Fig. 5, I show the figure of the boy and that of the pig mounted on the rotating platform 5, as the same is turned by the revolving table 30, of the talking-machine 31. The construction of the triangular-support 4, is such that its lower end will grip the post 29, sufficiently tight to maintain the support in vertical position, but it is preferable to use the base-flaps 17, 18 and 19, at the foot of the support to give a broader supporting base, and again it is better to also employ the broader member 6, in its circular form to make the support firmer in its operative position and when it is subjected to centrifugal force in the whirling motion of the parts. When the support fits snugly on the center post, the platform will revolve at the same speed as the disk and in synchronism therewith, but if the fit is a loose one, the motion of the platform may be slower than the disk owing to the lagging action. If preferred, the construction may be such that the platform will revolve intermittently, but the continuous motion is more desirable.

After the child has amused itself by cutting the several figures from the sheet and manipulating them so that they will stand up, and has made up the support and the attached platform, and an appropriate record-disk 55 has been placed on the talking-machine, the child proceeds to place the hollow end of the support over the post on the turn table and in vertical position, as shown in Fig. 5, with the base 6, engaging the record-disk 55. The cut-outs are then placed on the platform in any desired relation and the motor of the machine is started, so that as the record is played the platform turns therewith and carries around the superposed figures which are thereby caused to simulate certain pleasing motions or dancing actions, much to the amusement of the looker-on. The child may arrange the figures on the platform as he pleases and may then change them about while the platform is moving and re-arrange them in any way that may suggest itself to his fancy, and this will lend variety to the amusement. As the superposed figures are carried around with each turn of the record-disk and in synchronism therewith, the rhythm of the motion of the traveling figures will in a manner accord with that of the music coming from the record-disk, and this is a most pleasing and engaging feature of the device in its use, and lends additional significance and character to the same. While in the operation of the device there is a tendency of the figures to be thrown outwardly by centrifugal force, this is not great enough to dislodge the figures and to a certain extent this action may be controlled by regulating the diameter of the platform and keeping the radius sufficiently short.

It will be noted that the structure is such that it does not collide with or interfere with the tone-arm 32, of the talking-machine, the device having been especially designed to clear all parts of the machine and permit of the support and its platform being freely rotated by the rotatory motion of the turn-table. The support 4, is designed with practically the minimum lateral dimension and is a virtual extension of the pin or post 29, of the turn-table so that it does not spread out, and being hollow it is light in weight and does not tend to retard the movement of the turn-table. While I have shown the support as being polygonal or triangular in cross-section it will be understood that it may assume any shape in this respect and be made circular as well as polygonal, both of which forms provide strong structures. Of course, the use of this platform and its stand or support is not limited to application to a talking-machine, as it may be used with any rotary device or used alone as a toy in connection with cut-out figures. To make the platform and stand more durable, it may be made of light weight material other than fiber, for example aluminum, or celluloid.

It will thus be seen that by the use of my improvements, the child's creative and musical instincts or talents are aided and the child is also made more deft and neat in the use of its hands in making up the articles and applying them as described. Where the characters in the stories are historical or traditional, the child will be apt to imbibe some knowledge of such characters from playing with the figures representative thereof, and his interest in the characters will in this way be aroused, and thus the scheme has certain educational values.

Having thus described my invention, what I claim and desire to secure by Letters Patent, is:—

1. A cut-out toy made up of parts formed or represented on severable material in sheet form and having fold-lines indicated thereon, said parts being constructed and arranged to be cut out by a suitable instrument folded into certain devices and then assembled to form an operative toy including various characters or figures, an upright member formed into a hollow body from a flat cut-out piece and a platform attached to the upper end of said upright and upon which said detached figures are placed, the said upright being constructed to be mounted on the rotary table of a talking-machine in operative connection therewith and thereby cause said figures on the platform to travel around with the same.

2. A cut-out toy comprising parts formed or represented on severable material in sheet form and having fold-lines indicated thereon, the said parts being constructed and arranged to be cut from said material by a suitable instrument and folded into certain devices and then assembled to form an operative toy including various detached figures, an upright member and a platform secured to the upper end of said upright for sustaining the said figures thereon, the said upright being outlined in a single piece upon the said blank sheet with cut-out and folding lines indicated thereon and being constructed to be folded into a hollow body and held in operative form when folded and having its lower end constructed and arranged to be removably attached to the central post of the turn-table of a talking-machine, and actuated thereby to revolve said platform.

3. A cut-out toy comprising one or more sheets of severable material having produced thereon various figures, an upright-member folded from a flat cut-out piece, a platform-member for the upper end of said upright and a laterally-extending base-member for the foot of the upright-member, said three members being secured together when cut out, the lower end of said upright being constructed so as to be placed over the central pin on the rotary table of a talking-machine with said base-member adapted to engage the disk-record on the said table.

4. A rotatory toy comprising a platform and a depending support made of sheet material, said support being hollow at its lower end with yielding sides adapted to be sprung over a rotating part, said support being provided at its foot with a laterally extending flat member, a rotating sound-record receiving-table provided with a central post and a sound-record carried by said table, the said hollow end of said support fitting removably over said central post and said laterally extending flat member of said support engaging the upper surface of said sound-record in frictional contact therewith whereby said platform receives its rotatory motion from said table through the medium of the sole support of said platform.

5. A toy comprising a rotating cylindrical driving-member, a platform for receiving and sustaining toy-figures, a column attached to the under side of said platform for supporting and rotating it, said column having its lower end formed hollow with unbroken yielding polygonal sides constructed and arranged to fit snugly and removably over said cylindrical driving-member and grip the same to partake of its motion.

6. A toy comprising rotating means having a cylindrical part and a flat part, a platform having a depending hollow support provided at its foot with laterally extending flaps for bracing the same, a flat base-member secured to said flaps, the said support being constructed and arranged to be placed over said rotating member and driven thereby.

Signed at New York city, in the county of New York and State of New York, this 6th day of October, A. D. 1921.

BURGES JOHNSON.